United States Patent [19]

Young et al.

[11] Patent Number: 5,166,484
[45] Date of Patent: Nov. 24, 1992

[54] MICROWAVE SYSTEM AND METHOD FOR CURING RUBBER

[75] Inventors: Monroe Young, Greensboro, N.C.; John F. Gerling; John E. Gerling, both of Modesto, Calif.

[73] Assignee: ASTeX/Gerling Laboratories, Inc., Modesto, Calif.

[21] Appl. No.: 593,198

[22] Filed: Oct. 5, 1990

[51] Int. Cl.$^5$ .......................... H05B 6/68; H05B 6/78
[52] U.S. Cl. ...................... 219/10.55 A; 219/10.55 B; 219/400; 264/26; 425/174.8 E
[58] Field of Search ................. 219/10.55 R, 10.55 A, 219/10.55 B, 10.55 E, 10.55 M, 400; 264/25, 26; 425/174.8 R, 174.8 E; 34/1

[56] References Cited

U.S. PATENT DOCUMENTS

| | | | |
|---|---|---|---|
| 3,470,942 | 10/1969 | Fukada et al. | 219/10.55 B |
| 3,692,968 | 9/1972 | Yasuoka | 219/400 |
| 3,872,603 | 3/1975 | Williams et al. | 34/1 |
| 3,884,213 | 5/1975 | Smith | 219/10.55 R |
| 3,953,701 | 4/1976 | Manwaring | 219/10.81 |
| 4,154,861 | 5/1979 | Smith | 219/10.55 E |
| 4,173,608 | 11/1979 | Soulier | 264/26 |
| 4,196,330 | 4/1980 | Payne | 219/10.55 B |
| 4,289,792 | 9/1981 | Smith | 219/10.55 R |
| 4,332,992 | 6/1982 | Larsen et al. | 219/10.55 B |
| 4,338,911 | 7/1982 | Smith | 126/21 A |
| 4,405,850 | 9/1983 | Edgar | 219/10.55 A |
| 4,409,453 | 10/1983 | Smith | 219/10.55 A |
| 4,453,066 | 6/1984 | Mori | 219/10.55 B |
| 4,456,806 | 6/1984 | Arimatsu | 219/10.55 M |
| 4,507,531 | 3/1985 | Teich et al. | 219/10.55 B |
| 4,724,291 | 2/1988 | Inumada | 219/10.55 B |

Primary Examiner—Philip H. Leung
Attorney, Agent, or Firm—Flehr, Hohbach, Test, Albritton & Herbert

[57] ABSTRACT

System and method for processing extruded sponge rubber products and the like by simultaneously heating the products with microwave energy and impinging jets of high velocity hot air on the products. In one disclosed embodiment, the extruded sponge rubber parts are passed through a series of impingement rings in a microwave cavity, and each of the rings has a plurality of inwardly facing nozzles for directing jets of air in a radial direction toward the parts. Rollers transport the parts between the rings and can be driven at different speeds to accommodate elongation of the rubber parts as they expand. The microwave power is applied in pulses to provide more uniform heating of the parts, and the time base of the pulses can be changed without having to readjust the on-time of the pulses to maintain the on-time as a given percentage of the time base.

14 Claims, 3 Drawing Sheets

MICROWAVE SYSTEM AND METHOD FOR CURING RUBBER

This invention pertains generally to the manufacture of extruded sponge rubber products and, more particularly, to a system and method utilizing a combination of microwave energy and hot air for curing the rubber in such products.

Conventional microwave hot air systems heretofore utilized in the manufacture of rubber products introduce hot air at one end of a microwave cavity and remove it from the cavity at the other end, with the air flowing through the cavity past the product being vulcanized. This type of airflow has poor thermal transfer characteristics between the hot air and the product because of laminar air barriers around the product.

Another technique heretofore employed for heating rubber products is to immerse the products in a liquid salt bath, typically by placing the products from a vulcanizer under a stainless steel belt and pressing them down into the salt bath. This technique provides excellent heat transfer to the products and good foaming within the rubber, but presents environmental control problems in that salt from the bath collects on the products and must be rinsed off, leaving a salty rinse water which must be disposed of properly.

It is, therefore, an object of the invention to provide an new and improved system and method for processing sponge rubber products.

Another object of the invention is to provide a system and method of the above character which overcome the limitations and disadvantages of techniques heretofore provided for processing such products.

Another object of the invention is to provide a system and method of the above character which provide better results than the techniques heretofore provided.

These and other objects are achieved in accordance with the invention by simultaneously heating the rubber products with microwave energy and impinging jets of high velocity air on the products. In one disclosed embodiment, the extruded sponge rubber parts are passed through a series of impingement rings in a microwave cavity, and each of the rings has a plurality of inwardly facing nozzles for directing jets of air in a radial direction toward the parts. Rollers transport the parts between the rings and can be driven at different speeds to accommodate elongation of the rubber parts as they expand. The microwave power is applied in pulses to provide more uniform heating of the parts, and the time base of the pulses can be changed without having to readjust the on-time of the pulses to maintain the on-time as a given percentage of the time base.

FIGS. 4a and 4b are diagrammatic views of the air circulation system in the embodiment of FIG. 1, with FIG. 4b being an enlarged cross-sectional view taken along line 4b—4b in FIG. 4a.

Figure 1:
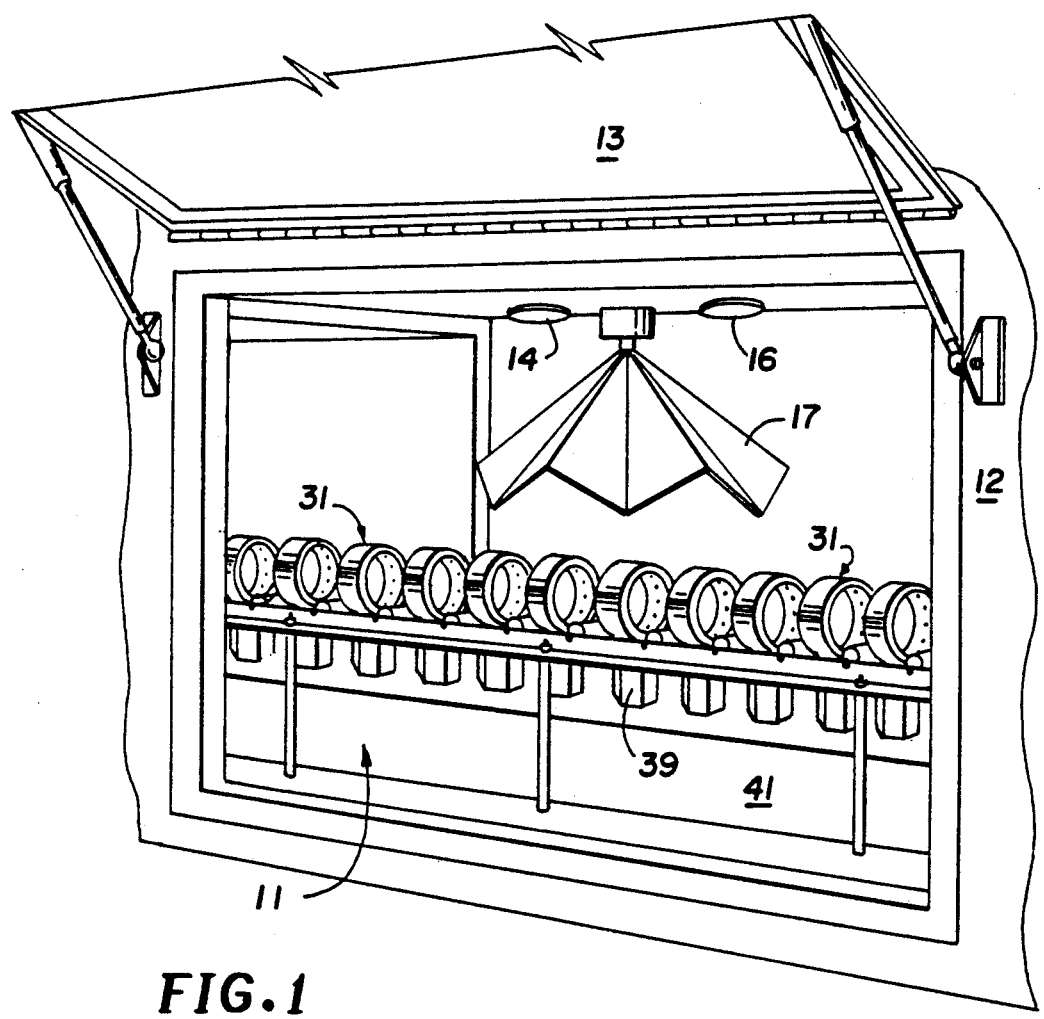
FIG. 1 is an isometric view of one embodiment of a rubber processing system according to the invention.
Figure 2:
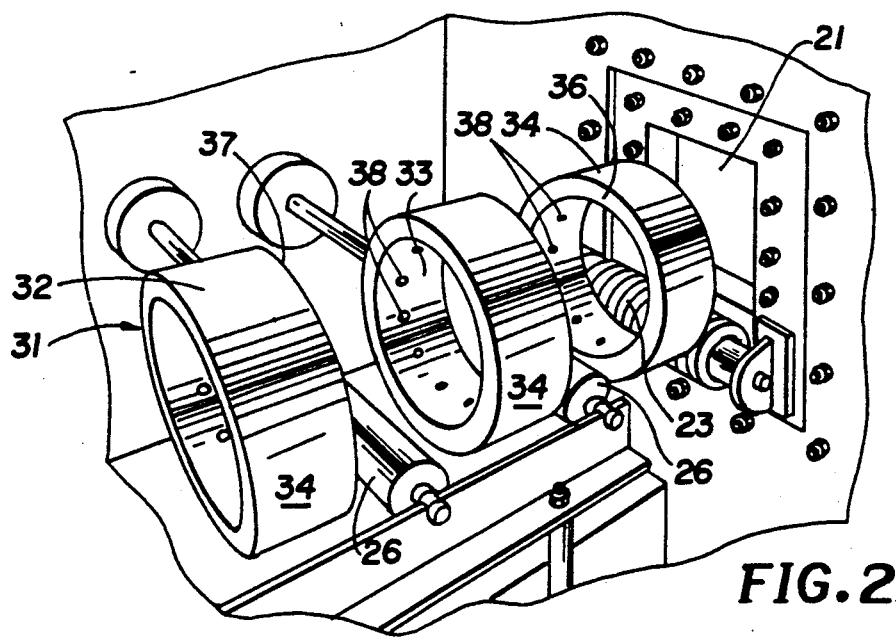
FIG. 2 is an enlarged fragmentary view of a portion of the embodiment of FIG. 1.
Figure 3:
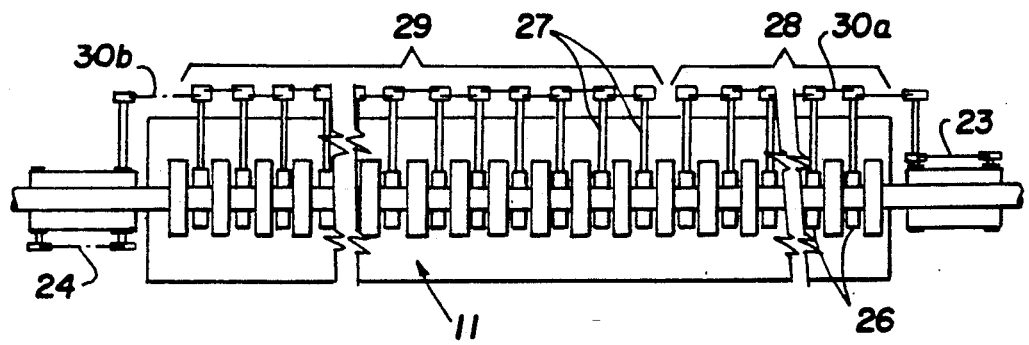
FIG. 3 is a diagrammatic view of the conveyor drive system in the embodiment of FIG. 1.
Figure 4A:
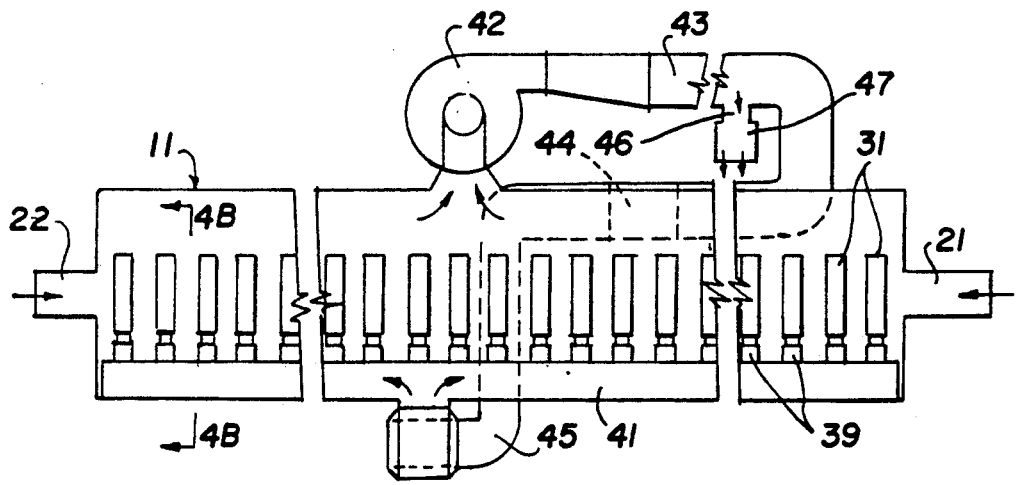
Figure 4B:
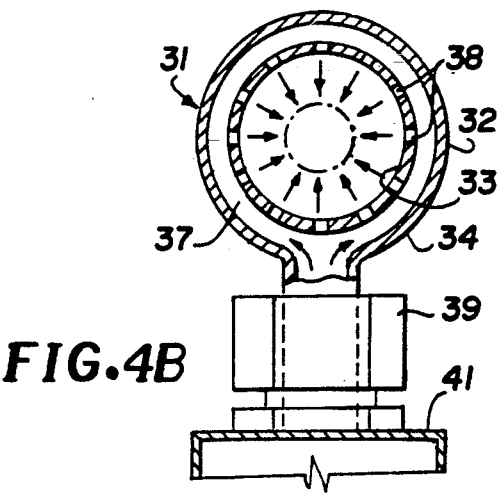

As illustrated in the drawings, the system includes a microwave cavity 11 which is formed within a generally rectangular housing 12 with a hinged access door 13, which is shown in a raised or open position in FIG. 1. A microwave power source (not shown) is located outside the housing, and microwave energy is introduced into cavity 11 through a pair of feed ports 14, 16 in the upper wall of the cavity. In one presently preferred embodiment, a separate power source is connected to each feed port, and each source can deliver up to 3 KW of microwave power to the cavity. A preferred magnetron for use in these power sources is the Model GL131 magnetron which is available from Gerling Laboratories, Modesto, Calif.

A mode stirrer 17 is positioned beneath the feed ports to provide more uniform heating of the product with microwave energy. The mode stirrer has a plurality of plates which reflect the microwave energy at different angles as they are rotated and shield the product from direct impingement of microwave energy from the feed ports. The angular reflection of the energy tends to eliminate hot and cold spots within the cavity on a time averaging basis, and avoiding direct impingement from the feed ports to the product provides reasonably uniform energy absorption around the circumference of the product and prevents a top-to-bottom nonuniformity in heating which might otherwise occur.

An entrance tunnel 21 is provided in one of the end walls of the microwave cavity, and an exit tunnel 22 is provided in the other. The two tunnels are aligned with each other and provide means for passing products to be treated into and out of the microwave cavity. The tunnels are of conventional design and include conveyors 23, 24 for the products. The conveyors include short lengths of belting, and the two conveyors can be driven at different speeds. The tunnels are of conventional design and control the escape of microwave energy from the cavity by absorbing any such energy which passes into them.

The rubber products are transported through the cavity by a series of rollers 26 which are spaced side-by-side along a path between the entrance tunnel and the exit tunnel and affixed to shafts 27. The rollers can be fabricated of any suitable material such as metal covered with Teflon. In the embodiment illustrated, the rollers are divided in two groups, with one group 28 being driven in synchronization with the inlet conveyor and a second group 29 being driven in synchronization with the exit conveyor. If desired, the rollers can be divided into additional groups driven by separate motors to provide additional versatility which is helpful when sponge rubber extrusions are processed. Such products expand and elongate as they pass through the microwave cavity, and the extended extrusions exiting the cavity travel at a faster linear speed than the unexpanded products entering the cavity from the extruder. The individual drives can be set to accommodate the different product speeds in different parts of the chamber. This represents a significant improvement over systems having a single belt extending from one end of a microwave chamber to the other because it eliminates the problems of product "squirming" on the belt and the damage, e.g. marking of the product and undesirable expansion properties, which can result from such movement. The rollers within each group can be drive chains 30a, 30b.

A plurality of air impingement rings 31 are also spaced apart along the path between the entrance and exit tunnels. These rings are positioned coaxially of each other, with the axes of the rings being aligned with the path. The feed rollers 26 are positioned between the rings, and the product passes through the openings in the rings.

Each of the rings has a body 32 comprising generally cylindrical inner and outer walls 33, 34 and a pair of annular end walls 36, 37, with a plurality of discharge openings or air nozzles 38 opening through the inner wall for directing high velocity jets of hot air toward the product passing through the cavity. The air nozzles in adjacent ones of the rings are displaced angularly or staggered from each other to further improve heating uniformity and prevent striping of the product.

Air is supplied to the chambers formed within the bodies of the impingement rings by ducts 39 which extend between the rings and a longitudinally extending plenum 41 in the lower portion of the microwave cavity. In the embodiment illustrated, the ducts have a generally rectangular cross-section and are adjustable in length to permit the height of the rings to be adjusted relative to the rollers to center products of different diameters within the rings.

Hot air is supplied to the impingement rings by a blower 42 located outside the microwave cavity above the top wall of the cavity housing. The inlet of the blower is communicates with the upper portion of the cavity, and air from the blower is discharged through a duct 43 to a space heater 44 having a plurality of electrical resistance heating elements (not shown) which can heat the air to a suitable temperature, e.g. 450° F. From the heater, the hot air is delivered to the plenum 41 by a supply duct 45.

An exhaust port 46 with a control valve 47 is provided in the duct between the blower and the heater to permit some of the recirculating air (e.g. 5–10 percent) to be bled off and replaced with make-up air which enters the cavity through entrance tunnel 21 and exit tunnel 22. This controls the buildup in the air system of contaminants which are given off by the product as it is brought up to the vulcanizing temperature. Further cleaning of the recirculating air is provided by incineration of some airborne contaminants by exposure to the electrical heating elements.

The high velocity jets of hot air thus produced impinge upon the product and break up the laminar air barrier around the product to provide an efficient thermal transfer between the hot air and the product. The amount of heat required for a given product is dependent upon the material involved as well as shape of the product. With products made of NBR/PVC blends, EPDM blends, polychloroprene, polyacrylate, EPDM and chlorosulfanated polyethylene, for example, suitable air temperatures are on the order of 300°–375° F. Such temperatures have been found to be suitable for products having a wide variety of shapes ranging from very intricate shapes having thin long sections to basic round tubes.

In one present embodiment, the feed rollers are spaced on 6 inch centers, with a similar spacing between the impingement rings. With this spacing, there is very little product sag between the rollers, even with hot extrusions of softer materials. Also, the air jets provide a levitating action between the rollers, which further helps to prevent sag. The levitation also reduces the weight of the product on the rollers and permits the rubber to be pulled as necessary to cause all speeds to be linear without stressing the product.

In addition to permitting complete circumferential jet air impingement on the product, the drive system has the additional advantage of eliminating any flat spots or belt marking which may degrade the product in a conventional microwave system.

Means is provided for turning the microwave power on and off in a pulsating manner to further improve heating uniformity. This has been found to be particularly helpful when rubber compounds are heated because it avoids the thermal runaway which might otherwise occur. Such runaway occurs because as temperature increases, the loss factor of the material also increases, which leads to temperature non-uniformities around the circumferences of irregularly shaped extrusions. Also, if more than one extrusion is being processed at a time, one of the extrusions generally cures faster than the others. By heating the rubber with microwave energy for a limited period of time and then stopping the microwave heating for a period of time sufficient to allow temperature equilibration to occur, more uniform microwave heating will result.

Figure 5:
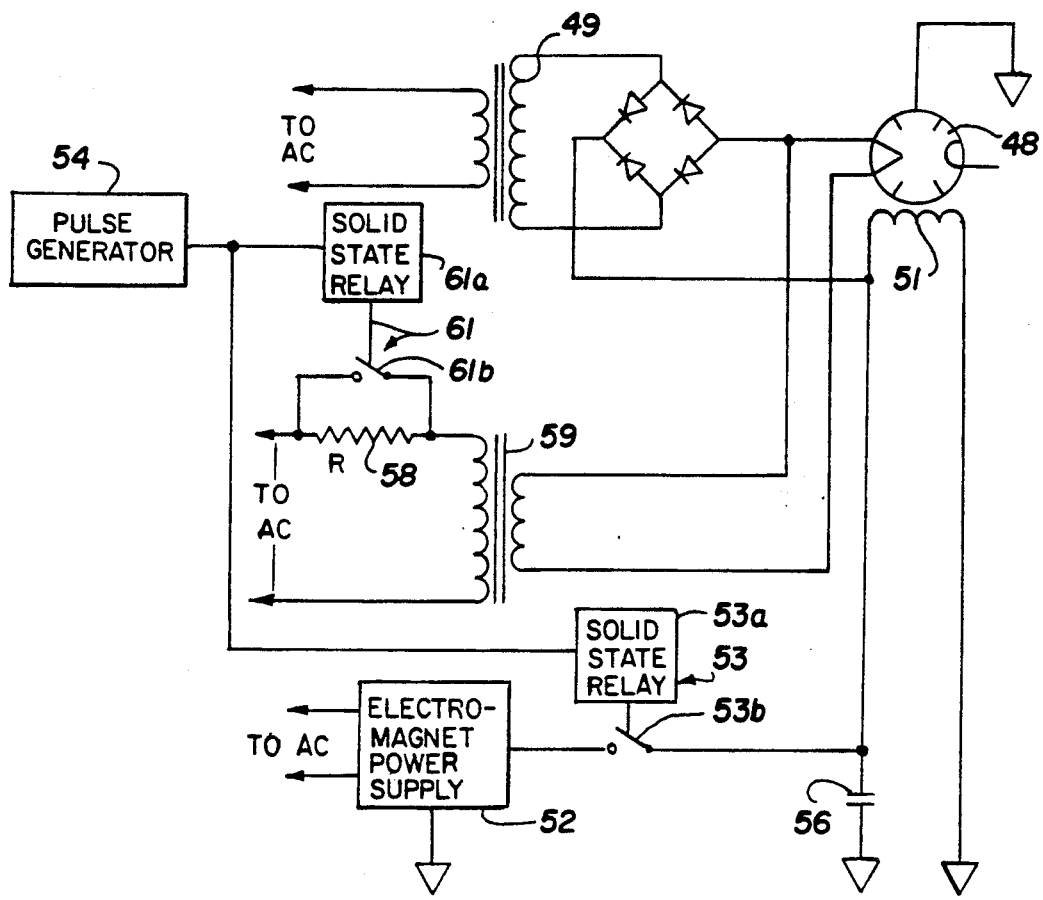
FIG. 5 is a block diagram of one embodiment of a pulsed microwave power generating system for use in the embodiment of FIG. 1.

The pulsed microwave power source illustrated in FIG. 5 includes a magnetron 48 which continuously receives high voltage from a high voltage supply 49. A pulsing power output is produced by pulsing the current supplied to the electromagnet 51 which generates the magnetic field inside the magnetron. Current is supplied to the electromagnet by a power supply 52, with a relay operated switch 53 having an operating coil 53a and a set of contacts 53b connected between the output of the power supply and the electromagnet. The delivery of current to the electromagnet is controlled by a pulse generator 54 connected to the relay coil.

When switch contacts 53b are open and no current is supplied to the electromagnet, the current which flows through the magnetron provides sufficient magnetic field to cause the operation of the magnetron to be stabilized. When switch contacts 53b are closed, power supply 52 delivers sufficient additional current so that the magnetic field within the magnetron rises to a point such that current will not be drawn at the high voltage which is applied to the magnetron.

A capacitor 56 is connected across the electromagnet in the magnetron to control the rate of current rise and fall in the electromagnet and assure that the current build-up and fall-off follows a smooth curve without significant transients, which is a very desirable feature in high power pulsed circuits.

In a typical example, a current on the order of 0.6 amperes flows through the electromagnet when the magnetron is operating at full power. A current of 1.0 amperes in the electromagnet is sufficient to raise the magnetic field to the point where current will not be drawn with the high voltage applied to the magnetron. The rise and fall time of the magnetron current during switching operations is on the order of 130 milliseconds.

Means is also provided for switching the filament voltage supplied to the magnetron simultaneously with the switching of the current supplied to the electromagnet. This means includes a resistor 58 connected in series with the primary of filament transformer 59, with a relay controlled switch 61 having an operating coil 61a connected to the output of the pulse generator and a set of contacts 61b connected in parallel with the series resistor. As the magnetron starts to operate, the resistor is switched into the circuit, reducing the filament voltage to compensate for backheating electrons, i.e. electrons which fall back onto the cathode and provide power to the filament, when the magnetron is operating at full power.

Figure 6:
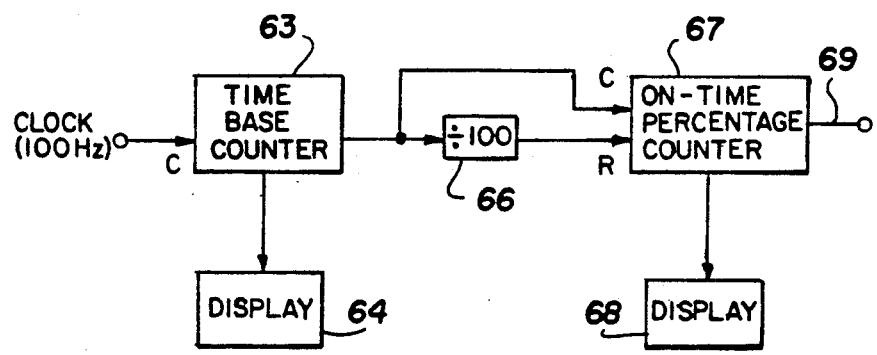
FIG. 6 is a block diagram of one embodiment of a pulse generator for use in the microwave power generating system of FIG. 5.

A preferred embodiment of pulse generator 54 is illustrated in FIG. 6. This pulse generator is particularly suitable for use in microwave heating applications, such as the rubber processing system and method of the invention, because it permits time base of the pulses (i.e. the time between the leading edges of successive pulses) to be adjusted without affecting the on-time or duration of the pulses as a percentage of the time base, and it is this percentage that determines the percentage of the average power delivered to the product being heated. With a 10 second time base, for example, a 5 second on-time provides 50 percent power.

By way of background, in domestic microwave ovens, the manner in which the power level in variable power systems is controlled is by providing a fixed time base and adjusting the on-time. In industrial systems where it is desirable to adjust the time base as well as the on-time percentage, the control system provides the ability to change the time base as well as the on-time percentage, but these changes are made independently of each other. In a typical system of the type heretofore provided, the operator first selects the time base, then sets the on-time to be the desired percentage of the time base. Any time the time base is changed, the on-time also has to be readjusted to maintain the desired on-time percentage.

With the circuit shown in FIG. 6, the time base can be changed without having to readjust the on-time percentage. The circuit includes a time base counter 63 which delivers output pulses at a rate corresponding to 100 times the desired time base in seconds. Clock pulses are applied to the time base counter from a conventional source such as a crystal controlled oscillator and a series of dividing registers (not shown). In one presently preferred embodiment, the time base can be adjusted in 1 second increments from 1 second to 99 seconds, and the on-time percentage can be set in 1 percent increments from 1% to 99% of the time base. In this embodiment, the clock pulses are supplied to the time base counter at a rate of 100 pulses per second. The time base can be set by any suitable means such as thumb wheel switches (not shown) connected to the preset inputs of counter 63, and the selected time base is indicated by a display 64 connected to the weighted output lines of the counter.

The overflow or carry output of counter 63 is connected to the clock input of a divide-by-100 counter 66 and to the clock input of an on-time percentage counter 67. The overflow output of the divide-by-100 counter 66 is connected to the reset input of the on-time percentage counter 67. The desired on-time percentage can be set by any suitable means such as thumb wheel switches (not shown) connected to the preset inputs of counter 67, and the selected on-time percentage is indicated by a display 68 connected to the weighted outputs of this counter. The signal at the overflow or carry output 69 of counter 67 is applied to the operating coils of relay controlled switches 53, 61 to control the operation of the magnetron.

On-time percentage counter 67 counts the pulses from the 5 output of time base counter which occur at a rate 100 times that of the time base reset pulses. This then produces a pulse at the output of the on-time percentage counter which repeats at the desired time base and has an on-time which is a set percentage of the time base.

Since counter 66 divides the count from time base counter 63 by exactly 100, the pulses which are counted by the on-time percentage counter have 1/100 of the duration of the time base pulses, and the pulses delivered by the on-time percentage counter are always a percentage of the time base no matter what the time base is set to.

If desired, two or more microwave cavities with hot air injection systems as described above can be placed end-to-end to provide sequential processing of extrusions and other products. A system having three such cavities, for example, would have six power sources, each of which could be controlled independently of the others. Each source can be individually selected for operation in a pulsing mode, and by the use of inverters, the pulses can be set to occur during the normal off period instead of the normal on time, giving the system even further versatility.

It is apparent from the foregoing that a new and improved system and method for curing rubber have been provided. While only certain presently preferred embodiments have been described in detail, as will be apparent to those familiar with the art, certain changes and modifications can be made without departing from the scope of the invention as defined by the following claims.

We claim:

1. In rubber processing system: an axially elongated sponge rubber product, means for moving the elongated sponge rubber product in an axial direction along a predetermined path, means for heating the elongated sponge rubber product with microwave energy as it moves along the path, and means for impinging high velocity jets of hot air from all sides radially onto the moving product to break up a laminar flow barrier around the moving product and promote heat transfer between the air and the product.

2. The system of claim 1 wherein the means for moving the product includes a plurality of rotatively driven feed rollers on which the elongated sponge rubber product rests directly.

3. The system of claim 2 wherein the rollers are divided into at least two groups which are driven at different speeds to accommodate for changes in the velocity of the elongated sponge rubber product due to expansion of the sponge rubber as the product moves along the path.

4. The system of claim 1 including means for turning the microwave energy on and off in a pulsating fashion.

5. The system of claim 4 wherein the means for turning the microwave energy on and off in a pulsating fashion includes means for maintaining the on-time of the pulses as a predetermined percentage of the time base of the pulses notwithstanding changes in the time base.

6. In system for processing extruded sponge rubber products: a microwave cavity, means for introducing microwave energy into the cavity, an entrance tunnel and an exit tunnel at opposite ends of the cavity, a plurality of rollers spaced side-by-side along a path between the tunnels for transporting the products through the cavity, a plurality of air impingement rings spaced along the path in alternating relationship with the rollers and oriented in coaxial alignment with the path so the products pass through the rings as they are transported through the cavity on the rollers, means for supplying hot air to the rings, and a plurality of nozzles carried by the rings for directing high velocity jets of the hot air onto the products as they are transported through the cavity to break up a laminar flow barrier around the products and promote heat transfer with the products.

7. The system of claim 6 wherein the rollers are divided into groups, with means for driving the rollers in different ones of the groups at different speeds.

8. The system of claim 6 wherein each of the air impingement rings has a cylindrical inner wall, and the nozzles comprise discharge openings spaced circumferentially about the inner wall.

9. The system of claim 8 wherein the discharge openings in adjacent ones of the rings are displaced angularly from each other.

10. The system of claim 6 wherein the microwave energy is introduced into the cavity in pulses, and the means for introducing microwave energy includes a time base counter for controlling the time between successive pulses, and means for maintaining the duration of the pulses as a predetermined percentage of the time between the pulses notwithstanding changes in the time between pulses.

11. In a microwave heating system: a microwave cavity, means for supporting a product to be heated within the cavity, operator controlled means for providing output pulses having an on time which is a percentage selected by the operator of the time between successive ones of the pulses, operator controlled means for changing the time between successive ones of the pulses without changing the percentage of the on time, means responsive to the output pulses for introducing microwave energy into the cavity in pulses to heat the product, and means for impinging high velocity jets of hot air onto the product to break up a laminar flow barrier around the product and promote heat transfer with the product.

12. In a microwave heating system: a microwave cavity, means for supporting a product to be heated within the cavity, a microwave source for supplying microwave energy to the cavity to heat the product, adjustable means for generating time base pulses which define a time base corresponding to the time between successive ones of the pulses, means responsive to the time base pulses for delivering output pulses having a duration which is a constant percentage of the time base notwithstanding changes in the time base, and means responsive to the output pulses for controlling operation of the microwave source to supply the energy to the cavity in pulses.

13. In a microwave heating system: a microwave cavity, means for supporting a product to be heated within the cavity, a microwave source for supplying microwave energy to the cavity to heat the product, a time base counter which counts clock pulses to provide pulses which define a time base, an on-time percentage counter, means for applying the pulses which define the time base to the clock input of the on-time percentage counter, a divide-by-100 counter connected between the output of the time base counter and the reset input of the on-time percentage counter, whereby the on-time percentage counter is adapted to deliver output pulses having a duration which is a predetermined percentage of the time base, and means responsive to the output pulses for controlling operation of the microwave source to supply the energy to the cavity in pulses.

14. In a microwave heating system: a microwave cavity, means for supporting a product to be heated within the cavity, operator controlled means for providing output pulses having an on time which is a percentage selected by the operator of the time between successive ones of the pulses, operator controlled means for changing the time between successive ones of the pulses without changing the percentage of the on time, and means responsive to the output pulses for introducing microwave energy into the cavity in pulses to heat the product.

* * * * *